United States Patent [19]

Calkins et al.

[11] Patent Number: 4,876,796

[45] Date of Patent: Oct. 31, 1989

[54] SPROCKET ASSEMBLY FOR CHAIN SAWS

[75] Inventors: Eugene E. Calkins, Salem; Michael V. Petrovich, Portland, both of Oreg.

[73] Assignee: Blount, Inc., Portland, Oreg.

[21] Appl. No.: 169,899

[22] Filed: Mar. 18, 1988

[51] Int. Cl.[4] .................... B23D 57/02

[52] U.S. Cl. .................... 30/383; 30/384; 474/162

[58] Field of Search .................... 30/381, 383-387; 403/359; 464/158, 162; 474/155-157, 162

[56] References Cited

U.S. PATENT DOCUMENTS 3,144,890 8/1964 Irgens .................... 30/383

*Primary Examiner*—Douglas D. Watts

*Attorney, Agent, or Firm*—Robert L. Harrington

[57] ABSTRACT

A sprocket assembly including a sprocket adapter driven by the motor of a chain saw. The adapter includes an adapter shaft which has a defined inner opening to fit around the drive shaft of the chain saw. A sprocket is mounted on the adapter shaft. Splines on the adapter shaft exterior fit into spline grooves of the sprocket. The thickness at the roots of the splines provide the strength to resist breakage. The exterior areas of the adapter shaft between the splines are flat landings which define relieved thickness areas between the splines and are aligned with tang-receiving pockets in the sprocket. The relieved areas permit an optimum sizing of the sprocket to the saw chain with sufficient pocket depth to fully receive the drive tangs of a saw chain. The sprocket rims are provided with mated inner edges that mate to the flat landings of the adapter shaft to facilitate transmission of the turning power from the drive shaft.

6 Claims, 2 Drawing Sheets

SPROCKET ASSEMBLY FOR CHAIN SAWS

FIELD OF INVENTION

This invention relates to the drive mechanism for chain saws and more particularly to a sprocket assembly that is adapted to transmit the drive of the saw's power head to the cutting chain.

BACKGROUND OF INVENTION

A chain saw is typically provided with a power head and sprocket drive mechanism for engaging and driving a loop of saw chain around a guide bar. A particular make and model of a chain saw power head is typically of a standard design and is intended to adapt to a variety of saw chain types and sizes. Similarly, each of the various saw chain types and sizes are of a standard design (including interconnected side links and center links having depending drive tangs) and are intended to adapt to a variety of chain saw power heads.

The components that provide the adaptation of different saw chain types and sizes to different chain saw power head makes and models are the sprocket and sprocket adapter, i.e. the sprocket assembly. The sprocket has radially projected teeth mated to a specific saw chain. The teeth engage the tangs of the saw chain for driving the saw chain around the guide bar. The type of sprocket contemplated herein is the rim sprocket which also includes circular side walls or rims that, together with the teeth, form pockets that confine the drive tangs. The rims of the sprocket also support the side links of the saw chain and through this support, determines the depth at which the center link drive tangs project down into the pockets. A center opening in the sprocket is provided with grooves for receiving the splines of the adapter which in turn is fit to the drive shaft of the power head.

The sprocket adapter includes a shaft with external splines that fit the grooves in the sprocket opening. Typically each spline on the adapter shaft coincides with a groove in the sprocket which is centered on a tooth of the sprocket (e.g. seven splines for seven sprocket teeth). The tangs on the chain are projected inwardly toward the adapter shaft but between the splines to maximize the effective pocket depth. An adapter cup is fixed to the shaft and is sized to fit the clutch mechanism of a specific chain saw type. It is through the clutch mechanism that the adapter cup and shaft, and ultimately the sprocket and saw chain are driven.

The sprocket and adapter are of little consequence in either weight or cost as compared to the power head and saw chain. Yet they are critical to the function of the chain saw. Unless a proper fit is provided to both the power head and saw chain, the chain saw will not operate properly.

The problem to which the present invention is directed is the relative sizing of the sprocket and adapter to each other and to the saw chain. The problem will be discussed herein generally relative to a seven tooth sprocket for a 0.325-inch pitch saw chain, a common saw chain size.

The 0.325-inch pitch spacing of the chain and the sprocket having seven teeth, together dictate the optimum outer circumference of the sprocket, i.e., the distance around the circular outer edges of the rims on which the side links of the chain are supported. The circumference of the sprocket in turn dictates the rim diameter. The pocket depth radially inwardly of the rim must accommodate the length of the drive tang extended inwardly from the side links. This pocket depth is determined by the adapter configuration to which the sprocket is mounted.

The conventional adapter has a radiused portion between adjacent splines that is the bottom of the pockets and is at a depth (the spacing from the rim's outer edge) that is less than that necessary to fully receive the tangs of the saw chain. This restriction imposed by the adapter configuration generated the requirement for increasing the rim diameter to shift the side links and thus the drive tangs radially outwardly on the sprocket. This, in turn, created a slight misfit as between the saw chain and the sprocket teeth and caused undue wearing of the sprocket and/or adapter. Such wearing has heretofore been tolerated as the only acceptable solution to the interference problem.

BRIEF DESCRIPTION OF THE INVENTION

The solution provided by the present invention is to modify the configuration of the adapter shaft. In brief, the previously curved area between the splines is flattened. The flat surface versus the curved surface provides for a slight deepening of the pocket which thereby enables the rim diameter to be shortened correspondingly. The inner diameter of the adapter shaft which is hollow must fit around the circular drive shaft of the power head and is thus maintained circular. The result is the generation of varying thicknesses of the adapter wall from maximum thickness adjacent the splines to minimum thickness at a mid-point between splines.

It has been determined that the greatest stress and occasion of most frequent breakage of the adapters is at the spline root. Thus thinning the adapter between the splines (and thus between the sprocket teeth when assembled) does not unduly weaken the adapter. However, providing the flattened areas provide the additional clearance for the tangs that is sufficient to allow for the optimum sizing of the sprocket, heretofore not possible.

The flat landings or pocket bottoms, i.e. the areas between the splines, provides an additional advantage. The sprocket configuration can be mated to the adapter configuration, i.e., with flat surfaces that engage the flat landings of the adapter, to assist in transmitting the load from the drive shaft. Heretofore, the total power from the drive shaft was transmitted to the saw chain through the splines of the adapter. The flat to flat surfaces transmit power in the same manner that a box-end wrench engages and turns a multi-sided nut.

The invention will be more fully understood by reference to the following detailed description and drawings wherein.

Figure 1:
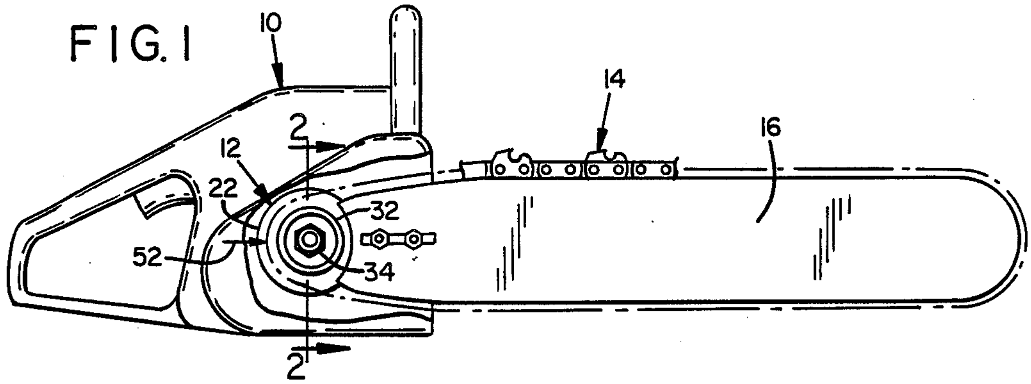
FIG. 1 is a view of a chain saw incorporating the present invention.

Reference is made to FIG. 1 of the drawings illustrating a chain saw including a power head 10 that drives a sprocket assembly 12. The sprocket assembly 12 in turn drives a saw chain loop 14 around a guide bar 16.

Figure 2:
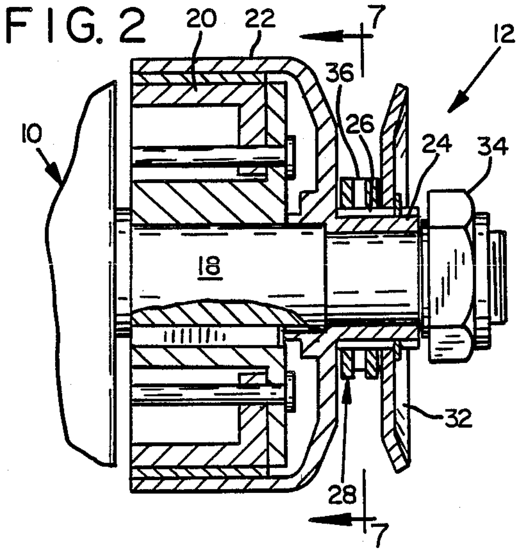
FIG. 2 is a sectional view of the sprocket assembly as taken on view line 2—2 of FIG. 1.
Figure 3:
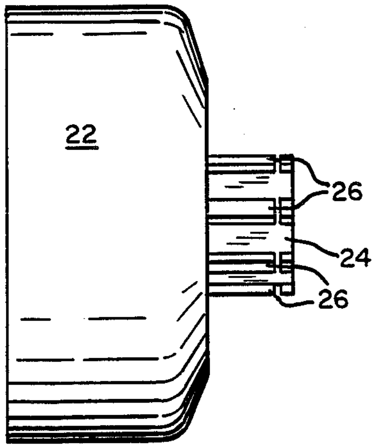
FIG. 3 is a side view of the sprocket adapter separated from the sprocket assembly shown in FIG. 2.

The sprocket assembly 12 is more clearly illustrated in the enlarged sectional view of FIG. 2, taken on view lines 2—2 of FIG. 1. The power head 10 drives a drive shaft 18. Attached to the drive shaft is a conventional centrifugal clutch member 20 which is not shown in detail as only its function is pertinent to an understanding of the invention. As the shaft 18 is rotated and brought up to speed, the clutch member 20 is forced outwardly by centrifugal action, against the inner wall of clutch cup 22 of the sprocket adapter. Clutch cup 22 is fixedly connected to a hollow shaft 24 having outer splines 26. Shaft 24 is loosely mounted on shaft 18 of the power head so that it may rotate on and relative to shaft 18.

Figure 4:
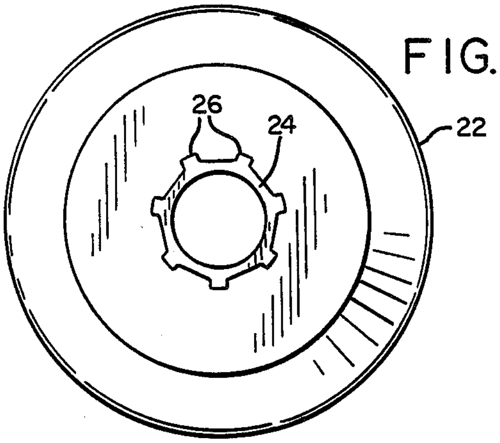
FIG. 4 is a front view of the sprocket adapter of FIG. 3.
Figure 7:
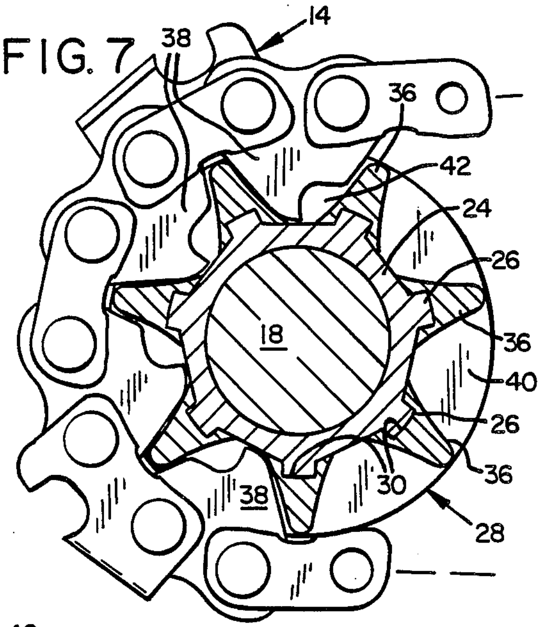
FIG. 7 is a sectional view of the sprocket as taken on view lines 7—7 of FIG. 2, but illustrating the entire sprocket assembly and saw chain mounted on the sprocket.
Figure 5:
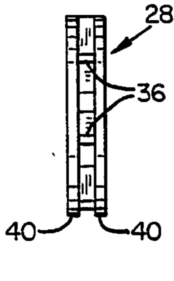
FIG. 5 is side view of the sprocket separated from the sprocket assembly shown in FIG. 2.
Figure 6:
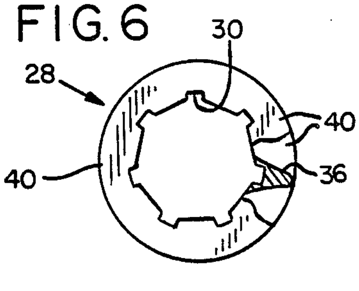
FIG. 6 is a front view of the sprocket of FIG. 5.

A sprocket 28 has spline grooves 30 that slidingly engage outer splines 26 of shaft 24 and is thus rotated with rotation of the adapter cup 22 (compare FIGS. 4 and 6). The remainder of the clutch assembly includes a backing plate 32 and a nut 34 that holds the entire sprocket assembly on shaft 18.

The above features as generally described are all common to the existing chain saw art. The invention concerns the interconnection as between the adapter shaft 24 and sprocket 28 and will now be described with reference to FIGS. 3 through 8.

First the problem. The diameter of sprocket 28 has to be matched to the pitch of the saw chain, i.e. the distance d (from FIG. 8) spanning three rivets should divide evenly into the circumference of the sprocket. In the illustrated embodiment, it has been determined that a seven-tooth sprocket having a circumference seven times the distance d is the desirable sprocket configuration. This circumference is preferably quite precise in order for the equally-spaced sprocket teeth 36 to cooperatively, simultaneously engage several saw chain drive tangs 38.

It was previously necessary to slightly enlarge the diameter of the sprocket rim 40 to avoid having the drive tangs 38 impact on the adapter shaft 24. This increased diameter moved the tangs 38 slightly out of the pocket 42 formed by the sprocket teeth 36 and rims 40, and solved the problem that was encountered (bottoming of the tangs). However, it also caused a slight mismatching of the teeth 36 and tangs 38, resulting in interference and undue wearing.

Figure 8:
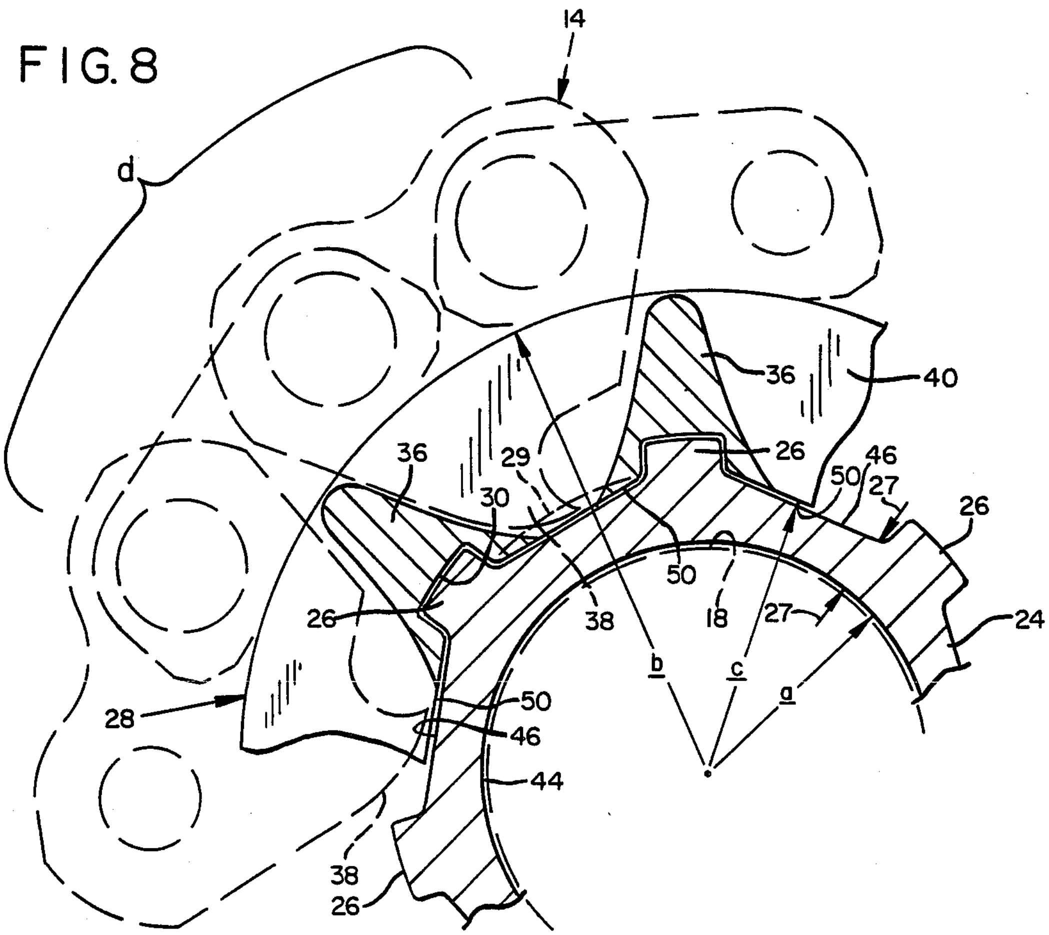
FIG. 8 is an enlarged partial view of the sprocket assembly for demonstrating the concept of the invention.

The improvement provided by the present invention is particularly demonstrated in the illustration of FIG. 8. (A separation is shown as between the adapter shaft 24 and sprocket 28, with the saw chain 14 and the saw's drive shaft 18 in dash lines for distinguishing between the various components.) A circular or cylindrical opening 44 is provided in the shaft 24 of the adapter to receive the drive shaft 18 of the power head 10. It will be appeciated that the radius a of this circular opening 44 is essentially prescribed by the diameter of shaft 18 onto which it must fit. Radius b of the rim 40 of the sprocket 28 is also fixed by the pitch of the saw chain 14 (assuming the optimum sprocket and adapter fit is to be achieved, i.e. with the several drive tangs 38 that are projected into the pockets 42 engaging corresponding sprocket teeth 36, as illustrated in FIG. 8). The downward, radially inward, extension of the tangs 38 from the saw chain side links are also a fixed relationship, (i.e. by the saw chain manufacturer) for stabilization of the chain on the guide bar.

The metal material making up the thickness of the adapter shaft 24 is placed under considerable stress as splines 26 force turning of the sprocket teeth 36 (which in turn drives the saw chain 14 in a cutting operation). It has long been believed that a minimum thickness of the shaft 24 is required or breakge occurs. That thickness is represented in FIG. 8 as the thickness at the roots of the splines 26 (arrows 27). It has heretofore been assumed that this thickness was required throughout the circumference of the shaft 24. Thus, consistent with the circular inner surface 44, the outer surface area, as between the splines, were curved to generate a constant thickness around the shaft. This prior design is illustrated generally in dashed line at reference 29.

The breakthrough for the present invention was the realization that breakage of the shaft, when it occurs, almost invariably occurs adjacent the splines 26. This initiated the idea for relieving the intermedate areas, i.e. between the splines. It was determined that a variation in the thickness could be tolerated to the extent of rendering the outer landing surfaces 46 substantially flat. Thus, the thickness adjacent the splines was retained and the thinning that developed was the difference as between the rounded inner surfaces 44 and the flat outer landing surfaces 46 at the seven areas between the seven splines 26.

A further benefit was developed by conforming the sprocket 28 to this new adapter configuration. The rims 40 extend radially inwardly alongside tangs 38 and are thus not a factor in the interference problem. The spline grooves 30, of course, extend axially of the sprocket through the rims and the sprocket teeth 36, as can be seen from FIGS. 6 through 8. The area 50 between the spline grooves on the sprocket rims can be extended radially inwardly to interface with the flat landings 46, as illustrated in FIG. 8. With the rim areas 50 engaging the landings 46, an additional gripping and force conveyance is provided. That is, the inter-engaging flat surfaces (50,46) function like wrench jaws acting against a nut. As the shaft 24 is turned, interference is created between the engaging flat surfaces and at least some of the turning force is thereby taken up by these interfacing surfaces. Previously, all of the turning force was focused onto the splines 26.

Furthermore, these flat surfaces provide a more even distribution of the forces. As the sprocket teeth forces the chain around the bar and as that force is resisted by the cutting action of the saw chain, an extreme load or pressure is directed forwardly by the saw chain against the sprocket (arrow 52 in FIG. 1). The chain presses against the sprocket, and the sprocket against the adapter. With the flat to flat contact of the sprocket rims and adapter shaft, as each of these areas gets rotated into the position of being impacted by that force, the force is absorbed evenly across the flat areas of interfernce fit, i.e. rearwardly of the point of minimum thickness indicated by radius c in FIG. 8, and lessens the problem of wearing.

The scope of the invention is defined in the claims appended hereto, and is not limited to the specific embodiment illustrated.

I claimed:

1. A sprocket assembly for a chain saw comprising; a sprocket and a sprocket adapter, said sprocket provided with rims and multiple sprocket teeth confined between the rims and forming therewith tang receiving pockets having open pocket bottoms, said sprocket adapter including an adapter shaft having a circular center opening adapted to receive the drive shaft of a chain saw power head and a determined outer configuration including outwardly projected splines having spline roots, said adapter shaft having a radial thickness adjacent the roots of the splines that is a determined thickness for strength and said configuration of the adapter shaft being characterized by relieved areas of thickness between the splines, said relieved areas of thickness including a minimum thickness at the center position between the splines and having progressively greater thicknesses progressing toward the spline roots, said sprocket having spline-receiving grooves positioned for receiving the splines of the adapter shaft whereby the open pocket bottoms between the teeth are positioned over the center position of the relieved areas of thickness between the spline roots upon assembly of the sprocket and sprocket adapter.

2. A sprocket assembly as defined in claim 1 wherein said relieved areas of thickness are provided by flat landing surfaces forming the outer surface of the adapter shaft between the splines, and said sprocket rims configured between the spline grooves with straight edges that mate with and engage the flat landing surfaces of the adapter shaft upon assembly 3. A sprocket asembly as defined in claim 1 wherein the sprocket has seven sprocket teeth and is adapted to fit a 0.325-inch pitch saw chain.

4. In a sprocket assembly, a rim sprocket comprising; a plurality of equidistantly spaced sprocket teeth having separated root portions, said teeth captured between two spaced apart disk-shaped rims and defining therewith open-bottom pockets, said rims each having a configured center opening adapted to receive a configured splined shaft of a sprocket adapter wherein areas between the splines are flat, said configured opening in the rims having spline-receiving grooves and flat areas between the grooves that compliment the flat areas between the splines of the adapter shaft whereby the respective flat areas are in contact for distribution of load forces in a cutting operation.

5. In a sprocket assembly, a rim sprocket and an adapter, the adapter having a shaft with a configured exterior and the rim sprocket having a center opening that is configured to mate with the configured exterior of the adapter shaft to be rotatably driven by the adapter shaft and in turn to drive a saw chain entrained on the rim sprocket, and the improvement that comprises;

said adapter shaft having an axis of rotation and a plurality of projections spaced symetrically around the shaft periphery, said projections having similar radial dimensions measured from the axis of rotation, said projections forming the outer most radial positions of the shaft configuration, a commonly located exterior positions between each adjacent pair of projections that are the innermost radial position of the configuration, said shaft having a direction of rotation and said shaft configuration having driving surfaces between the innermost positions and following outermost projections, said driving surfaces having continuously increasing radii from the innermost position to the following outermost projection, and said driving surfaces extending at least half the distance between the respective projections, and said rim sprocket opening configured to define driven surfaces precisely matched and mated to the driving surfaces of the shaft configuration whereby the rotative driving force of the shaft driving surfaces is distributed across the rim sprocket driven surfaces.

6. In a sprocket assembly, a rim sprocket and an adapter as defined in claim 5 wherein the innermost position of the shaft configuration is positioned at the mid-point between the projections.

* * * * *